United States Patent [19]

Matsushita et al.

[11] Patent Number: 5,717,009
[45] Date of Patent: Feb. 10, 1998

[54] ADHESIVE COMPOSITION AND PROCESS FOR CURING THE SAME

[75] Inventors: Shigeki Matsushita; Fumihiko Kobayashi, both of Tokyo, Japan

[73] Assignee: Toshiba Silicone Co., Ltd., Tokyo, Japan

[21] Appl. No.: 676,300

[22] PCT Filed: Jan. 20, 1995

[86] PCT No.: PCT/JP95/00051

§ 371 Date: Jul. 17, 1996

§ 102(e) Date: Jul. 17, 1996

[87] PCT Pub. No.: WO95/20019

PCT Pub. Date: Jul. 27, 1995

[30] Foreign Application Priority Data

Jan. 21, 1994 [JP] Japan ................. 6-005192

[51] Int. Cl.$^6$ ................. C08K 9/06
[52] U.S. Cl. ................. 523/212; 523/213; 524/781; 524/783; 524/785; 524/788; 525/104; 525/106; 525/477; 528/38
[58] Field of Search ................. 528/38; 523/212, 523/213; 524/783, 785, 788, 781; 525/104, 106, 477

[56] References Cited

U.S. PATENT DOCUMENTS

| | | | |
|---|---|---|---|
| 3,890,271 | 6/1975 | Kokoszka | 528/38 |
| 4,602,078 | 7/1986 | Joseph et al. | 528/38 |
| 4,797,446 | 1/1989 | Dietlein et al. | 528/38 |
| 5,300,611 | 4/1994 | Fujioka et al. | 528/38 |

FOREIGN PATENT DOCUMENTS

| | | |
|---|---|---|
| 60-158254 | 8/1985 | Japan. |
| 2-151659 | 6/1990 | Japan. |

*Primary Examiner*—Melvyn I. Marquis
*Attorney, Agent, or Firm*—Jordan and Hamburg

[57] ABSTRACT

An adhesive composition which comprises:

(A) 100 parts by weight of a polyorganosiloxane represented by the formula (I):

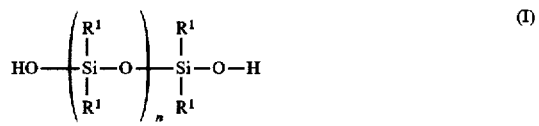

(wherein $R^1$'s may be the same or different from each other and each represent a monovalent hydrocarbon group or a halogen-substituted hydrocarbon group; and n is a positive integer);

(B) 0.5 to 10 parts by weight of a tetraalkoxysilane represented by the following formula:

$$R^2{}_a Si(OR^3)_{4-a} \qquad (II)$$

(wherein $R^2$ represents an alkyl group having 1 to 3 carbon atoms, a phenyl group or a vinyl group; $R^3$ represents an alkyl group having 1 to 4 carbon atoms or an alkoxy-substituted alkyl group having 3 to 6 carbon atoms; and a is 0 or 1), or a partially hydrolyzed condensate thereof; and (C) 0.1 to 15 parts by weight of a trialkoxysilane represented by the formula (III):

$$R^4(R^5)_b Si(OR^6)_{3-b} \qquad (III)$$

(wherein $R^4$ represents a substituted or unsubstituted aminoalkyl group; $R^5$ represents an alkyl group having 1 to 3 carbon atoms, a phenyl group or a vinyl group; $R^6$ represents an alkyl group having 1 to 3 carbon atoms; and b is 0 or 1), wherein the molar ratio of total alkoxy groups in Components (B) and (C) to hydroxyl groups in Component (A) is $(-OR^2+-OR^6)/-OH>8$, and a process for curing the same.

27 Claims, No Drawings

ADHESIVE COMPOSITION AND PROCESS FOR CURING THE SAME

BACKGROUND OF THE INVENTION

This invention relates to an adhesive composition which cures in a rubbery state and a process for curing the same. More specifically it relates to an adhesive silicone rubber composition which has an excellent curing rate, deep portion curing property and adhesiveness and is suitable for use as an adhesive or sealing material, and a process for curing the same.

Compositions which cure in a rubbery state by a condensation reaction of a polyorganosiloxane having a silanol group and a silane or siloxane having a silicon functional group have been widely used for parts of automobiles, parts of electric and electronic instruments, etc. by utilizing excellent characteristics such as heat resistance, weather resistance, electric characteristics, etc. Particularly, the above compositions in a deacetic acid curing type, deoximation curing type and deacetone curing type have excellent adhesiveness in addition to the above characteristics so that a high value as an adhesive or sealing material is set on them.

In order to improve the adhesiveness of these adhesive silicone rubber compositions, various proposals have been made. For example, in Japanese Patent Publication No. 11272/1971, it has been disclosed that adhesiveness to various adherends is improved by formulating an alkoxysilane having an amino group into a deoximation type adhesive silicone rubber composition. Further, for the same purpose, there have been disclosed a formulation of a silyl ester such as silyl maleate, silyl fumarate, silyl succinate, etc. containing a trimethoxysilyl group in Japanese Provisional Patent Publication No. 20032/1981 and a formulation of an alkoxysilane having an amino group bonded to a silicon atom through a 2-(p-benzyl)ethyl group in Japanese Patent Publication No. 35373/1985.

It has been proposed that by formulating such an adhesiveness-improving agent into a dealcoholation type composition which is said to be non-adhesive although it is a condensation reaction type silicone rubber composition, or combining a special curing catalyst with an adhesiveness-improving agent, adhesiveness is imparted to obtain an adhesive silicone rubber composition. For example, in Japanese Provisional Patent Publication No. 21157/1986, it has been disclosed that a silane containing 3 amino-nitrogen atoms such as N-[(3-trimethoxysilyl)propyl] diethylenetriamine, etc. is formulated into a composition having such a curing mechanism to impart adhesiveness. Also, in Japanese. Provisional Patent Publication No. 15900/1973, it has been disclosed that an adhesive composition is obtained according to the same curing mechanism by using a titanium chelate compound as a curing catalyst and using an organosilicon compound in which an alkoxysilyl group is bonded to an isocyanuric ring through a carbon chain, as an adhesiveness-improving agent.

However, all of such condensation reaction type adhesive silicone rubber compositions are the type which react with water (moisture) in the air by a catalytic action of an organic compound having a metal atom in a molecule, including an organic acid salt of a metal such as tin, etc., a dialkyltin dialiphatic acid salt, dialkyltin dialkoxide, dialkyltin oxide, titanium tetraalkoxide and a partially hydrolyzed product thereof, a titanium chelate compound, a zirconium chelate compound, an aluminum trialkoxide and a partially hydrolyzed condensate thereof, and an aluminum chelate compound, etc. and are cured gradually from a surface to an inner portion. Therefore, the curing time is long Additionally, it may not cure properly, particularly when it is used for adhesion of a thick portion or a portion into which water in the air is difficultly permeated. For example, 7 to 10 days are required for curing a composition having a thickness of 10 mm, and about one month is required for curing a composition having a thickness of 20 mm.

When such an adhesive silicone rubber is put to practical use as an adhesive or sealing material, limitations in steps frequently occur because of a long curing time, particularly poor curing occurs in thick portions as described above. For example, when a FIPG sealing material for an oil pan of an engine of an automobile is to be formed, it is necessary to carry out a test run of the engine within about 1 hour after sealing. However, in most cases, only the surface of the sealing material is cured so that there is a possibility that problems such as oil leakage, etc. result. Also, when it is used for fixing electric and electronic parts by adhesion, it is used mostly in a continuous operation line where parts need to be conveyed to the next step, several hours after sealing, and it is inconvenient if the parts need to be left to stand for one day or longer for curing and aging.

Therefore, it has been proposed that a composition having a faster curing rate be used, constitutional components of said composition are divided into two respective containers and stored, the composition is prepared by mixing them immediately before use and using it immediately. For example, in Japanese Provisional Patent Publication No. 50287/1991, there has been disclosed a method in which a mixture containing a polydiorganosiloxane having a molecular chain wherein both ends are terminated by a silyl group having one or two hydrolyric group(s), respectively, and a curing catalyst, as described above, is previously prepared. This is mixed with a mixture containing a silanol group-containing polyorganosiloxane, and the resulting mixture is discharged and cured on the surface of an adherend.

However, also in this case, there is a curing mechanism to which water in the air is contributed basically. Since curing proceeds from the surface, only about 8.5 mm from the surface is cured after one month under standard operation circumstances (25° C., 60% RH), and a deeper portion of 10 mm or more is not cured sufficiently. Further, in order to synthesize the above polydiorganosiloxane having a molecular chain wherein both ends have a hydrolyric group (s), there is required a step of reacting a polydiorganosiloxane having an end terminated by a silanol group with a silane compound having a corresponding hydrolyric group while heating.

On the other hand, there has been known a curing mechanism in which in the presence of a minute amount of a platinum type catalyst, curing is effected by a hydrosilylation reaction between an alkenyl group of an alkenyl group-containing polyorganosiloxane and a Si—H bond of a polyorganohydrogensiloxane to form a rubbery elastic material. By using this curing mechanism, there is an addition reaction type adhesive silicone rubber composition into which a silane compound or siloxane compound having a carbon functional group such as a (meth)acryloyl group and an epoxy group in the molecule, or a cyclic siloxane having at least one of the above carbon functional groups or a side chain containing a trialkoxysilyl group and an ester bond, and also having a hydrogen atom bonded to a silicone atom of a ring is formulated as an adhesiveness-improving agent. This composition does not have a curing mechanism to which water in the air is contributed so that deep portion curing property is excellent, but it uses a minute amount of a platinum type catalyst so that it is liable to be damaged by catalyst poison, and heating is required for curing depending on the composition, whereby use and use conditions are limited.

OBJECT AND SUMMARY OF THE INVENTION

An object of the present invention is to provide a condensation reaction type adhesive silicone rubber composition which has rapid curing property, and be cured in a thick portion in a short time, exhibits excellent adhesiveness to a wide range of various adherends in a short time and is suitable for an adhesive or sealing material, and a process for curing the same.

The present inventors have studied intensively in order to achieve the above object and consequently found that in a curable polyorganosiloxane composition having a dealcoholation type curing mechanism, when an aminoalkyl type alkoxysilane or a partially hydrolyzed condensate thereof is used as an adhesiveness-improving agent, a composition having a large curing rate and further excellent thick portion curing property can be obtained.

DETAILED DESCRIPTION OF THE INVENTION

The adhesive composition of the present invention comprises:

(A) 100 parts by weight of a polyorganosiloxane represented by the formula (I):

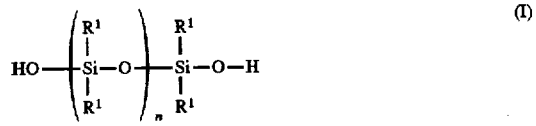

(wherein $R^1$s may be the same or different from each other and each represent a monovalent hydrocarbon group or a halogen-substituted hydrocarbon group; and n is a positive integer);

(B) 0.5 to 10 parts by weight of a tetraalkoxysilane represented by the formula (II):

$$Si(OR^3)_4 \qquad (II)$$

(wherein $R^3$ represents an alkyl group having 1 to 4 carbon atoms or an alkoxy-substituted alkyl group having 3 to 6 carbon atoms), or a partially hydrolyzed condensate thereof; and (C) 0.1 to 15 parts by weight of an trialkoxysilane represented by the formula (III):

$$R^2Si(OR^6)_3 \qquad (III)$$

(wherein $R^4$ represents a substituted or unsubstituted aminoalkyl group; and $R^6$ represents an alkyl group having 1 to 3 carbon atoms), or a partially hydrolyzed condensate thereof, wherein the molar ratio of total alkoxy groups in Components (B) and (C) to hydroxyl groups in Component (A) is $(—OR^3+—OR^6)/—OH>8$.

Further, the process for curing the adhesive composition of the present invention comprises mixing Components (A), (B) and (C) described above so that the molar ratio of total alkoxy groups in Components (B) and (C) to hydroxyl groups in Component (A) is $(—OR^3+—OR^6)/—OH>8$, and curing the mixture, preferably mixing 1̂ a premixture of Components (A) and (B) described above and Component (C), 2̂ a premixture of Components (A) and (C) and Component (B), 3̂ Component (A) and a premixture of Components (B) and (C) or 4̂ a premixture of Components (A) and (C) and a premixture of Components (A) and (B), or 5̂ independently storing Component (A), Component (B) and Component (C), mixing them and curing the mixture.

Component (A) is a base polymer of the adhesive composition of the present invention and is a straight polyorganosiloxane with molecular ends each having one silanol group.

That is, Component (A) is an α,ω-dihydroxypolydiorganosiloxane represented by the following formula:

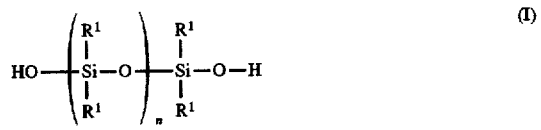

(wherein $R^1$s may be the same or different from each other and each represent a monovalent hydrocarbon group or a halogen-substituted hydrocarbon group; and n is such a positive integer that said polyorganosiloxane has a viscosity within the range described below). $R^1$ may be exemplified by a chain or branched alkyl group having 1 to 10 carbon atoms such as methyl, ethyl, propyl, butyl, pentyl, hexyl, octyl, decyl, etc.; a cycloalkyl group having 3 to 6 carbon atoms such as cyclohexyl, etc.; an alkenyl group having 2 to 6 carbon atoms such as vinyl, allyl, etc.; a substituted or unsubstituted aryl group such as phenyl, etc.; an aralkyl group having 7 to 12 carbon atoms such as 2-phenylethyl, 2-phenylpropyl, etc.; and a halogen-substituted hydrocarbon group such as chloromethyl, 3-chloropropyl, 3,3,3-trifluoropropyl, p-chlorophenyl, etc. From the facts that the composition before curing has a viscosity in such a range that handling is easy and the composition after curing has excellent rubbery elasticity and typically exhibits various characteristics such as heat resistance, cold resistance, weather resistance, etc. which are characteristics of a polyorganosiloxane, it is preferred that 90% or more thereof are methyl groups and it is further preferred that substantially all are methyl groups. As a part of $R^1$, there may be suitably introduced a phenyl group particularly when heat resistance, cold resistance and/or radiation resistance is/are required, or a 3,3,3-trifluoropropyl group when solvent resistance and/or oil resistance is/are required.

In the formula (I), n is a positive integer satisfying a viscosity range described below, preferably 50 to 2,000, more preferably 250 to 1,500.

In the present invention, the viscosity of the polyorganosiloxane to be used as Component (A) is, at 25° C., generally 100 to 1,000,000 cP, preferably 500 to 100,000 cP. If it is less than 100 cP, the composition after curing does not exhibit sufficient physical properties, while if it exceeds 1,000,000 cP, the apparent viscosity of the composition in an uncured state is high so that it is difficult to carry out mixing for obtaining a uniform composition and an operation of extruding the composition on the surface of an adherend, and also curing property tends to be poor. Component (B) to be used in the present invention functions as a crosslinking agent to Component (A) and is a tetraalkoxysilane represented by the formula:

$$\text{Si(OR}^3)_4 \tag{II}$$

(wherein R³ represents an alkyl group having 1 to 4 carbon atoms or an alkoxy-substituted alkyl group having 3 to 6 carbon atoms),
or a partially hydrolyzed condensate thereof.

R³ may be exemplified by a lower alkyl group such as methyl, ethyl, propyl and butyl, etc.; and an alkoxy-substituted alkyl group such as 2-methoxyethyl, 2-ethoxyethyl, 2-propoxyethyl and 2-butoxyethyl, etc. Since a rapid curing rate is given, methyl, ethyl and 2-methoxyethyl groups are preferred, and a methyl group is most preferred. Such Component (B) may be exemplified by a methoxysilane such as tetramethoxysilane, etc.; an ethoxysilane such as tetraethoxysilane, etc.; an isopropoxysilane such as tetraisopropoxysilane, etc.; a 2-methoxyethoxysilane such as tetrakis(2-methoxyethoxy) silane, etc. and partially hydrolyzed condensates thereof. Since a rapid curing rate is given, preferred are tetramethoxysilane and a partially hydrolyzed condensate thereof, and tetraethoxysilane and a partially hydrolyzed condensate thereof, and particularly preferred are tetraethoxysilane, tetramethoxysilane and partially hydrolyzed condensates thereof.

The amount of Component (B) to be used is 0.5 to 10 parts by weight, preferably 2 to 8 parts by weight based on 100 parts by weight of Component (A). If it is less than 0.5 part by weight, a sufficient curing rate cannot be obtained and physical characteristics of a cured product are poor. On the other hand, if it exceeds 10 parts by weight, a cured product is brittle.

Component (C) to be used in the present invention not only functions as a curing catalyst for accelerating the reaction of Component (A) and Component (B), but also functions as an adhesiveness-imparting agent for exhibiting excellent adhesiveness to various adherends when the composition is cured. This Component (C) is a trialkoxysilane having a substituted or unsubstituted aminoalkyl group, represented by the formula:

$$\text{R}^4\text{Si(OR}^6)_3 \tag{III}$$

(wherein R⁴ represents a substituted or unsubstituted aminoalkyl group; R⁶ represents an alkyl group having 1 to 3 carbon atoms),
or a partially hydrolyzed condensate thereof.

R⁴ may be exemplified by an aminoalkyl group such as 3-aminopropyl, 4-aminobutyl, etc.; and a substituted aminoalkyl group such as N-methyl-3-aminopropyl, N-(2-aminoethyl)-3-aminopropyl, etc. From good curing property and adhesiveness, a N-(2-aminoethyl)-3-aminopropyl group is preferred. R⁶ may be exemplified by a lower alkyl group such as methyl, ethyl, propyl, etc., and from ease of synthesis, methyl is preferred. Such Component (C) may be exemplified by an aminoalkyl group-containing alkoxysilane such as 3-aminopropyltrimethoxysilane, 3-aminopropyltriethoxysilane, 3-aminopropylmethyldimethoxysilane, N-methyl-3-aminopropyltrimethoxysilane, etc.; a substituted aminoalkyl group-containing alkoxysilane such as N-(2-aminoethyl)-3-aminopropyltrimethoxysilane, etc.; and partially hydrolyzed condensates thereof. Among these, based on good curing property and adhesiveness, N-(2-aminoethyl)-3-aminopropyltrimethoxysilane is preferred.

The amount of Component (C) to be used is 0.1 to 15 parts by weight, preferably 0.5 to 5 parts by weight based on 100 parts by weight of Component (A). If it is less than 0.1 part by weight, a sufficient adhesive effect cannot be obtained, while if it exceeds 15 parts by weight, a cured product is brittle.

The adhesive composition of the present invention is characterized in that with respect to Components (A), (B) and (C) described above, the molar ratio of total alkoxy groups (including an alkoxyalkoxy group in Component (B)) in Components (B) and (C) to hydroxyl groups in Component (A) is (—OR³+—OR⁶)/—OH>8. If the ratio of alkoxy groups/hydroxyl groups is 8 or less, sufficient curing rate and adhesiveness cannot be obtained. The above molar ratio is preferably 10 to 100, more preferably 10 to 50.

The adhesive composition of the present invention contains Components (A), (B) and (C) described above. It has been known that such a composition is stored with the organic compound having a metal atom in a molecule described above in a single tightly closed container and extruded on the surface of an adherend, followed by curing and adhering. In such a composition, the above metal atom-containing organic compound functions as a curing catalyst for accelerating curing based on the crosslinking reaction of Component (A) by Component (B).

One characteristic feature of the present invention resides in that it is substantially free of the above metal atom-containing organic compound which functions as a curing catalyst for accelerating curing based on the crosslinking reaction of Component (A). In the composition of the present invention, Component (C) functions not only as an adhesiveness-imparting agent, but also as a curing catalyst. Further, it has been found that in the present composition, as compared with a system in which the metal atom-containing organic compound is present, a rapid curing rate and good curing in a thick portion of the composition can be obtained at room temperature.

In the adhesive composition of the present invention, in order to provide the necessary physical properties, suitable amounts of various fillers may be formulated, if necessary. The filler to be used may be exemplified by aerosol silica, silica aerogel, precipitated silica, diatomaceous earth, pulverized quartz, fused silica and an oxide such as iron oxide, zinc oxide, titanium oxide, etc.; materials obtained by treating the surfaces of these with a hydrophobicity-imparting agent such as trimethylchlorosilane, dimethyldichlorosilane, hexamethyldisilazane or octamethylcyclotetrasiloxane, etc.; a carbonate such as calcium carbonate, magnesium carbonate, zinc carbonate, etc.; a composite oxide such as asbestos, glass wool, mica fine powder, etc.; a conductive filler such as carbon black, copper powder, nickel powder, etc.; and powder of a synthetic resin such as polymethylsilsesquioxane, polystyrene, polyvinyl chloride, polypropylene, etc.

The amounts of these fillers to be formulated are preferably 5 to 200 parts by weight, more preferably 10 to 100 parts by weight based on 100 parts by weight of Component (A).

The adhesive composition of the present invention exhibits excellent adhesiveness due to the presence of Component (C). In order to further improve adhesiveness, an adhesiveness-improving agent may be added. Such an adhesiveness-improving agent may be exemplified by an epoxy group-containing silane such as 3-glycidoxypropyltrimethoxysilane, 3-glycidoxypropylmethyldimethoxysilane, etc.; and an isocyanuric ring-containing silicon compound such as 1,3,5-tris(3-trimethoxysilylpropyl)isocyanurate, etc.

The amounts of these adhesiveness-improving agents to be formulated are preferably 0.1 to 10 parts by weight, more preferably 0.5 to 5 parts by weight based on 100 parts by weight of Component (A).

Further, the composition of the present invention may include a pigment, a dye, a flame-retardant, a heat resistance-improving agent, a thermal conductivity-improving agent, a thixotropy-imparting agent, etc. Still further, in order to control flowability, the composition of the present invention may be diluted with a non-reactive silicone oil such as polydimethylsiloxane, etc. The amount of the silicone oil to be formulated is preferably an amount less than 100 parts by weight based on 100 parts by weight of Component (A). If the formulation amount is 100 parts by weight or more, the non-reactive silicone oil is oozed out from a cured product in some cases. Further, the composition of the present invention may be used by diluting it with an organic solvent represented by a hydrocarbon type solvent such as toluene, xylene, petroleum ether, gasoline, benzine, kerosine, etc.; a ketone type solvent such as acetone, methyl ethyl ketone, etc.; or an ester type solvent such as ethyl acetate, butyl acetate, etc.

The adhesive composition of the present invention starts to be cured immediately after mixing so that at least one component of Components (A), (B) and (C) is stored in a different container and mixed with other components immediately before use to form a rubbery elastic cured product. As a combination of storing the respective components as described above, there may be mentioned a method of storing 1̂ Components (A) and (B) and Component (C), 2̂ Components (A) and (C) and Component (B), 3̂ Component (A) and Components (B) and (C) or 4̂ Components (A) and (C) and Components (A) and (B) in different containers, respectively, or storing 5̂ Component (A), Component (B) and Component (C) in independent containers, respectively. From the viewpoint of storage stability and operability, 1̂ or 4̂ is preferred. Here, when a container having plural sections partitioned by partition walls, etc. so as not to mix with each other is used, each section is regarded as one container.

In the following, explanation is made by taking the above combination 1̂ or 4̂ as an example. In general, under a state where moisture is intercepted, a first mixture containing Component (A) and Component (B) is previously prepared and stored in a tightly closed container in which moisture does not permeate. To this, Component (C) alone, or a second mixture containing Component (C) or Component (A) and Component (C) is introduced immediately before use and a composition is prepared by mixing uniformly by stirring, followed by defoaming, or mixing by using such a mixer that no bubbles are mixed in, for example, a two liquid mixing static mixer. The filler and other additives may be suitably formulated into either of the mixtures. Particularly when the filler is formulated into the second mixture in the combination of 1̂ , a non-reactive silicone oil may be formulated in order to make said mixture flowable. Preparation of the composition may be carried out at room temperature without any problem, and if desired, slight heating to a temperature in the range that Component (B) is not volatilized may be carried out.

The prepared composition is immediately coated on the surface of an adherend uniformly. Coating may be carried out at room temperature without any problem. After coating, the composition is cured through its thick portions in a short time at room temperature and exhibits excellent adhesiveness to various adherends. Curing proceeds quickly at ordinary temperature, for example, it takes only about 20 minutes at a temperature of 25° C. and a relative humidity of 60% to cure a sheet having a thickness of 10 mm completely and exhibit excellent adhesiveness to an adherend.

EXAMPLES

In the following, the present invention is described in more detail by Examples and Comparative examples. In these examples, part always represents part by weight, and all physical property values such as viscosity, etc. are values at 25° C. The present invention is not limited by these Examples.

Evaluations of compositions in the course of curing to after curing respecting hardness and a cohesive failure ratio were conducted according to the following methods.

(1) Hardness

From a composition, a test piece having a size of 20 mm×80 mm and a thickness of 6 mm was prepared and left to stand in the air for a predetermined time. Thereafter, hardness was measured according to JIS K 6301 by using a JIS A hardness tester.

(2) Cohesive failure ratio

An epoxy glass laminate having a width of 25 mm was used as an adherend. End portions thereof were superposed by 10 mm in a longitudinal direction, a composition was coated between both laminates at a superposed portion so as to have a thickness of 1 mm and left to stand in the air to be cured so that both laminates were adhered. After a predetermined time passed, both adhered laminates were pulled in the longitudinal direction at a rate of 10 mm/min by using a tensile tester, and the cohesive failure ratio of the adhesive layer was measured to evaluate adhesiveness at an interface.

EXAMPLES 1 TO 4

By using formulation compositions shown in Table 1, two kinds of mixtures were prepared. That is, polydimethylsiloxane wherein both ends are terminated by a silanol group and having a viscosity of 3,000 cP was mixed with aerosol silica having a surface treated with hexamethyldisilazane and having a specific surface area of 200 m$^2$/g and tetramethoxysilane to prepare a first mixture. Further, polydimethylsiloxane having both ends each terminated by a trimethylsilyl group was mixed with aerosol silica having a surface treated with octamethylcyclotetrasiloxane and having a specific surface area of 200 m$^2$/g and various kinds of amino-group-containing alkoxysilanes shown in Table 1 to prepare second mixtures. The first mixture and the second mixture were mixed by a two liquid mixing static mixer at a weight ratio of 10:1 to prepare compositions of the present invention, and the compositions were left to stand at a temperature of 25° C. and a relative humidity of 60%.

The hardness and cohesive failure ratio were measured in each sample 20 minutes after mixing. The results are shown in Table 1. In all of the Examples, after 3 hours, all of the samples were cured completely in a rubbery state.

TABLE 1

|  |  |  | Example 1 | 2 | 3 | 4 |
|---|---|---|---|---|---|---|
| Formulation (part) | First mixture (I) | Silanol-terminated polydimethylsiloxane*[1] | 100 | 100 | 100 | 100 |
|  |  | Aerosol silica*[2] | 15 | 15 | 15 | 20 |
|  |  | Tetramethoxysilane | 5 | 5 | 5 | 4 |
|  | Second mixture (II) | Trimethylsilyl-terminated polydimethylsiloxane*[3] | 100 | 100 | 100 | 100 |
|  |  | Aerosol silica*[4] | 10 | 10 | 10 | 10 |
|  |  | 3-Aminopropyltrimethoxysilane |  |  | 35 |  |
|  |  | 3-Aminopropyltriethoxysilane |  | 35 |  |  |
|  |  | N-(2-aminoethyl)-3-aminopropyl-trimethoxysilane |  |  |  | 35 |
|  |  | N-(2-aminoethyl)-3-aminopropyl-methyldimethoxysilane | 35 |  |  |  |
|  | Mixing ratio of (I):(II) |  | 10:1 | 10:1 | 10:1 | 10:1 |
|  | (Alkoxy groups)/(hydroxy groups) |  | 33 | 35 | 37 | 30 |
| Properties (20 minutes after mixing) | Hardness (JIS A) |  | 14 | 14 | 16 | 20 |
|  | Cohesive failure ratio (%) |  | 100 | 100 | 100 | 100 |

(Note)
*[1] Viscosity 3,000 cP
*[2] Specific surface area 200 m²/g, treated with hexamethyldisilazane
*[3] Viscosity 1,000 cP
*[4] Specific surface area 200 m²/g, treated with octamethylcyclotetrasiloxane

COMPARATIVE EXAMPLE 1

In the same manner as in Example 1 except for using 3-glycidoxypropyltrimethoxysilane in place of aminoalkyl group-containing alkoxysilane, a composition for comparison was prepared according to formulation amounts shown in Table 2, and by using it, a sample was prepared in the same manner as in Example 1. Even after 3 hours passed, the composition was not cured.

TABLE 2

|  |  |  | Comparative example 1 |
|---|---|---|---|
| Formulation (part) | First mixture (I) | Silanol-terminated polydimethylsiloxane*[1] | 100 |
|  |  | Aerosol silica*[2] | 15 |
|  |  | Tetramethoxysilane | 5 |
|  | Second mixture (II) | Trimethylsilyl-terminated polydimethylsiloxane*[3] | 100 |
|  |  | Aerosol silica*[4] | 10 |
|  |  | 3-Glycidoxypropyltrimethoxysilane | 35 |
|  | Mixing ratio of (I):(II) |  | 10:1 |
|  | (Alkoxy groups)/(hydroxyl groups) |  | 34 |
| Properties (20 minutes after mixing) | Hardness (JIS A) |  | Uncured |
|  | Cohesive failure ratio (%) |  | — |

(Note)
*1 to 4: the same as in Table 1

EXAMPLES 5 TO 8

By using formulation compositions shown in Table 3, mixtures were prepared. That is, polydimethylsiloxane wherein having both ends are terminated by a silanol group and having a viscosity of 10,000 cP was mixed with aerosol silica having a surface treated with hexamethyldisilazane and having a specific surface area of 200 m²/g, tetraethoxysilane, 3-glycidoxypropyltrimethoxysilane and 1,3,5-tris(3-trimethoxysilylpropyl)isocyanurate and further mixed with 3-aminopropyltriethoxysilane or N-(2-aminoethyl)-3-propyltrimethoxysilane to prepare mixtures of the present invention. These mixtures were made to have a thickness of 6 mm and left to stand at a temperature of 25° C. and a relative humidity of 60%.

With respect to each sample obtained by mixing, a time for a dry to the touch was measured. The results are shown in Table 3. In all of the Examples, the compositions were dry to the touch within 1 hour, the samples were completely cured to inner portions in a rubbery state.

TABLE 3

|  |  | Example 5 | 6 | 7 | 8 |
|---|---|---|---|---|---|
| Formulation (part) | Silanol-terminated polydimethylsiloxane*[1] | 100 | 100 | 100 | 100 |
|  | Aerosol silica*[2] | 10.0 | 11.5 | 11.6 | 10.0 |
|  | Tetraethoxysilane | 5.0 | 2.0 | 2.0 | 1.5 |
|  | 3-Glycidoxypropyltrimethoxysilane |  | 0.5 | 1.0 |  |
|  | 1,3,5-Tris(3-trimethoxysilylpropyl)isocyanurate |  | 0.5 | 1.0 |  |
|  | 3-Aminopropyltriethoxysilane |  | 0.6 |  | 0.9 |
|  | N-(2-aminoethyl)-3-aminopropyltrimethoxysilane | 2.0 |  | 1.1 |  |
|  | (Alkoxy groups)/(hydroxyl groups) | 29 | 15 | 20 | 10 |
| Characteristic value | Time for dry to the touch (min) | 10 | 20 | 50 | 40 |

(Note)
*[1] Viscosity 10,000 cP
*[2] Specific surface area 200 m²/g, treated with hexamethyldisilazane

COMPARATIVE EXAMPLES 2 TO 3

By using formulation compositions shown in Table 4, Comparative examples 2 and 3 were prepared in the same manner as in Examples 5 to 8.

With respect to each sample obtained by mixing, a time for a dry to the touch was measured. The results are shown in Table 4. The dry to touch times of Comparative examples 2 and 3 were longer by about 3 times as compared with that of Example 8 in which common materials were used.

TABLE 4

|  | Comparative example | |
|---|---|---|
|  | 2 | 3 |
| Formulation (part) Silanol-terminated polydimethylsiloxane*¹ | 100 | 100 |
| Aerosol silica*² | 10.0 | 10.0 |
| Tetraethoxysilane | 1.0 | 0.5 |
| 3-Aminopropyltriethoxysilane | 0.6 | 1.2 |
| (Alkoxy groups)/(hydroxyl groups) | 7 | 7 |
| Characteristic value Time for dry to the touch (min) | 120 | 120 |

(Note)
*¹Viscosity 10,000 cP
*²Specific surface area 200 m²/g, treated with hexamethyldisilazane Utilizability in industry According to the present invention, it is possible to obtain an adhesive composition which has rapid curing property, is cured to a deep portion at ordinary temperature in a short time, exhibits excellent adhesiveness to a wide range of various adherends in a short time and does not suffer from catalyst poison. The composition of the present invention is suitably used for an adhesive or sealing material, a FIPG sealing material, etc. of parts of automobiles, parts of electric and electronic instruments, etc.

We claim:

1. An adhesive composition which comprises:

(A) 100 parts by weight of a polyorganosiloxane represented by the formula (I):

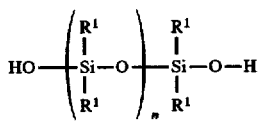

(I)

wherein $R^1$s may be the same or different from each other and each represent a monovalent hydrocarbon group or a halogen-substituted hydrocarbon group; and n is a positive integer;

(B) 0.5 to 10 parts by weight of a tetraalkoxysilane represented by the formula (II);

(II)

wherein $R^3$ represents an alkyl group having 1 to 4 carbon atoms or an alkoxy-substituted alkyl group having 3 to 6 carbon atoms,
or a partially hydrolyzed condensate thereof; and (C) 0.1 to 15 parts by weight of a trialkoxysilane represented by the formula (III):

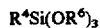

(III)

wherein $R^4$ represents a substituted or unsubstituted aminoalkyl group; and $R^6$ represents an alkyl group having 1 to carbon 8 atoms,
or a partially hydrolyzed condensate thereof, wherein the molar ratio of total alkoxy groups in said Components (B) and (C) to hydroxyl groups in said Component (A) is (—$OR^3$+—$OR^6$)/—OH>8, and said composition contains substantially no metal atom-containing organic compound which functions as a curing catalyst for accelerating curing based on a crosslinking reaction of Component (A).

2. The composition according to claim 1, wherein in the formula (I), $R^1$ is selected from the group consisting of a chain or branched alkyl group having 1 to 10 carbon atoms; a cycloalkyl group having 3 to 6 carbon atoms; an alkenyl group having 2 to 6 carbon atoms; a substituted or unsubstituted aryl group; an aralkyl group having 7 to 12 carbon atoms; and the above hydrocarbon group substituted by a halogen atom.

3. The composition according to claim 1, wherein in the formula (I), $R^1$ is selected from the group consisting of methyl, ethyl, propyl, butyl, pentyl, hexyl, octyl, decyl, cyclohexyl, vinyl, allyl, phenyl, 2-phenylethyl, 2-phenylpropyl, chloromethyl, 3-chloropropyl, 3,3,3-trifluoropropyl and p-chlorophenyl.

4. The composition according to claim 1, wherein the viscosity of Component (A) is, at 25° C., 100 to 1,000,000 cP.

5. The composition according to claim 1, wherein the viscosity of Component (A) is, at 25° C., 500 to 100,000 cP.

6. The composition according to claim 1, wherein in the formula (II), $R^2$ is a methyl group, an ethyl group, a propyl group, a vinyl group or a phenyl group, and $R^3$ is a methyl group, an ethyl group, a propyl group, a butyl group, a 2-methoxyethoxy group, a 2-ethoxyethoxy group, a 2-propoxyethoxy group or a 2-butoxyethoxy group.

7. The composition according to claim 1, wherein in the formula (II), $R^3$ is a methyl group, an ethyl group, a propyl group or a 2-methoxyethoxy group, and a is 0.

8. The composition according to claim 1, wherein the compound of the formula (II) is selected from tetramethoxysilane, methyltrimethoxysilane, ethyltrimethoxysilane, vinyltrimethoxysilane, phenyltrimethoxysilane, tetraethoxysilane, methyltriethoxysilane, vinyltriethoxysilane, phenyltriethoxysilane, tetraisopropoxysilane, methyltriisopropoxysilane, tetrakis(2-methoxyethoxy) silane, methyltris-(2-methoxyethoxy) silane, vinyltris(2-methoxyethoxy) silane or partially hydrolyzed condensates thereof.

9. The composition according to claim 1, wherein the compound of the formula (II) is selected from tetramethoxysilane or a partially hydrolyzed condensate thereof, tetraethoxysilane or a partially hydrolyzed condensate thereof, methyltrimethoxysilane, vinyltrimethoxysilane or methyltriethoxysilane.

10. The composition according to claim 1, wherein the compound of the formula (II) is selected from tetraethoxysilane or tetramethoxysilane.

11. The composition according to claim 1, wherein Component (B) is present in an amount of 2 to 8 parts by weight based on 100 parts by weight of Component (A).

12. The composition according to claim 1, wherein in the formula (III), $R^4$ is a 3-aminopropyl, 4-aminobutyl, N-methyl-3-aminopropyl or N-(2-aminoethyl)-3-aminopropyl group, $R^5$ is a methyl, ethyl, propyl, phenyl or vinyl group, and $R^6$ is a methyl, ethyl or propyl group.

13. The composition according to claim 1, wherein in the formula (III), $R^4$ is a 3-aminopropyl, 4-aminobutyl, N-methyl-3-aminopropyl or N-(2-aminoethyl)-3-aminopropyl group, $R^6$ is a methyl, ethyl or propyl group, and b is 0.

14. The composition according to claim 1, wherein in the formula (III), $R^4$ is a N-(2-aminoethyl)-3-aminopropyl group.

15. The composition according to claim 1, wherein the compound of the formula (III) is selected from 3-aminopropyltrimethoxysilane, 3-aminopropyltriethorysilane, 3-aminopropylmethyldimethoxysilane, N-methyl-3-aminopropyltrimethoxysilane, N-(2-aminoethyl)-3-aminopropyltrimethoxysilane, N-(2-aminoethyl)-3-aminopropylmethyldimethoxysilane or partially hydrolyzed condensates thereof.

16. The composition according to claim 1, wherein Component (C) is used in an amount of 0.5 to 5 parts by weight based on 100 parts by weight of Component (A).

17. The composition according to claim 1, wherein the molar ratio of total alkoxy groups in Components (B) and (C) to hydroxyl groups in Component (A) is in the range of 10 to 100.

18. The composition according to claim 1, further comprising a filler selected from the group consisting of aerosol silica, silica aerogel, precipitated silica, diatomaceous earth, pulverized quartz, fused silica, iron oxide, zinc oxide and titanium oxide; materials obtained by treating the surfaces of these with trimethylchlorosilane, dimethyldichlorosilane, hexamethyldisilazane or octamethylcyclotetrasiloxane; calcium carbonate, magnesium carbonate and zinc carbonate; asbestos, glass wool and mica fine powder; carbon black, copper powder and nickel powder; and polymethylsilsesquioxane, polystyrene, polyvinyl chloride and polypropylene.

19. The composition according to claim 18, wherein the filler is aerosol silica treated with trimethylchlorosilane, dimethyldichlorosilane, hexamethyldisilazane or octamethylcyclotetrasiloxane.

20. A process for curing an adhesive composition, which comprises mixing (A) 100 parts by weight of a polyorganosiloxane represented by the formula (I):

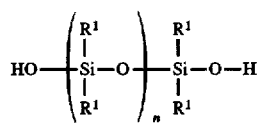
(I)

wherein $R^1$s may be the same or different from each other and each represent a monovalent hydrocarbon group or a halogen-substituted hydrocarbon group; and n is a positive integer;

(B) 0.5 to 10 parts by weight of a silane represented by the formula (II):

$$Si(OR^3)_4 \qquad (II)$$

wherein $R^3$ represents an alkyl group having 1 to 4 carbon atoms or an alkoxy-substituted alkyl group having 3 to 6 carbon atoms;

or a partially hydrolyzed condensate thereof; and (C) 0.1 to 15 parts by weight of a trialkoxysilane represented by the formula (III):

$$R^4Si(OR^6)_3 \qquad (III)$$

wherein $R^4$ represents a substituted or unsubstituted aminoalkyl group; and $R^6$ represents an alkyl group having 1 to 3 carbon atoms, or a partially hydrolyzed condensate thereof so that the molar ratio of total alkoxy groups in said Components (B) and (C) to hydroxyl groups in Component (A) is ($-OR^3$+$-OR^6$)/$-OH$>8, and said composition contains substantially no metal atom-containing organic compound which functions as a curing catalyst for accelerating curing based on a crosslinking reaction of Component (A), and curing the mixture.

21. The process according to claim 20, wherein said step of mixing mixes Components (A) and (B) to make a premixture and further comprises mixing the premixture with Component (C).

22. The process according to claim 20, wherein mixing is carried out at room temperature.

23. The process according to claim 20, wherein mixing is carried out while heating at a temperature in a range where Component (B) is not volatilized.

24. The process according to claim 20, wherein said step of mixing mixes Components (A) and (C) to make a premixture and mixes the premixture with Component (B).

25. The process according to claim 20, wherein said step of mixing mixes Components (B) and (C) to make a premixture and mixes the premixture with Component (A).

26. The process according to claim 20, further comprising independently storing Component (A), Component (B) and Component (C) prior to the step of mixing.

27. The process according to claim 20, wherein said step of mixing mixes Components (A) and (C) to make a first premixture, mixes Components (A) and (B) to make a second premixture and mixes the first premixture with the second premixture.

* * * * *